US011320522B1

(12) United States Patent
Avci et al.

(10) Patent No.: US 11,320,522 B1
(45) Date of Patent: May 3, 2022

(54) SYSTEM AND METHOD FOR FMCW LIDAR WITH DC LASER

(71) Applicant: Aeva, Inc., Mountain View, CA (US)

(72) Inventors: Oguzhan Avci, Cupertino, CA (US); Omer P. Kocaoglu, Fremont, CA (US); Neal N. Oza, Palo Alto, CA (US); Keith Gagne, Santa Clara, CA (US); Behsan Behzadi, Sunnyvale, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 272 days.

(21) Appl. No.: 16/573,919

(22) Filed: Sep. 17, 2019

(51) Int. Cl.
| | | |
|---|---|---|
| G01C 3/08 | (2006.01) | |
| G01S 7/4911 | (2020.01) | |
| G01S 7/499 | (2006.01) | |
| G01S 17/58 | (2006.01) | |
| G01S 17/34 | (2020.01) | |

(52) U.S. Cl.
CPC ............ *G01S 7/4911* (2013.01); *G01S 7/499* (2013.01); *G01S 17/34* (2020.01); *G01S 17/58* (2013.01)

(58) Field of Classification Search
CPC ........ G01S 7/4911; G01S 7/499; G01S 17/34; G01S 17/58
See application file for complete search history.

(56) References Cited

U.S. PATENT DOCUMENTS

| | | | | |
|---|---|---|---|---|
| 2015/0185246 A1* | 7/2015 | Dakin | .................... | G01S 17/58 |
| | | | | 356/28 |
| 2019/0018110 A1* | 1/2019 | Kremer | ................. | G01S 7/4914 |
| 2019/0257927 A1* | 8/2019 | Yao | ....................... | G01S 7/4817 |

FOREIGN PATENT DOCUMENTS

| | | | | |
|---|---|---|---|---|
| DE | 102018116956 A1 | * | 1/2019 | .............. G01S 7/48 |
| WO | WO2020018805 A1 | * | 1/2020 | ............. G01S 17/34 |

* cited by examiner

*Primary Examiner* — Mark Hellner
(74) *Attorney, Agent, or Firm* — Womble Bond Dickinson (US) LLP (57) ABSTRACT

A light detection and ranging (LIDAR) system uses optical sources to emit a continuous-wave (CW) optical beam and a frequency-modulated (FMCW) optical beam. A first set off optical components is coupled with the optical sources to generate a CW local oscillator (LO) signal from the CW optical beam, to generate an FMCW LO signal from the FMCW optical beam, and to combine the CW optical beam and the FMCW optical beam into a combined optical beam. A second set of optical components is coupled with the first set of optical components, to transmit the combined optical beam toward a target environment and to receive a target return signal from the target environment. A third set of optical components is coupled with the second set of optical components, to generate and detect a target velocity component of the target return signal and a target range component of the target return signal.

29 Claims, 10 Drawing Sheets

SYSTEM AND METHOD FOR FMCW LIDAR WITH DC LASER

TECHNICAL FIELD

The present disclosure relates generally to light detection and ranging (LIDAR) that provides simultaneous measurement of range and velocity across two dimensions.

BACKGROUND

LIDAR systems designed to provide range and velocity data typically require a combination of two or more frequency modulated laser systems with chirped or counter-chirped lasers. However, these systems are complex and expensive.

SUMMARY

The present disclosure describes LIDAR systems and methods for determining simultaneously the range and velocity of targets in a scanned field of view. A fixed frequency (i.e., unmodulated) continuous wave (CW) laser is dedicated to measuring processing, the Doppler shift (velocity component) of target return signals. Another CW laser is linearly modulated ("chirped"), allowing target range to be determined from a delay dependent frequency offset in the target return signal, independent of the velocity component. The present disclosure includes, without limitation, the following example embodiments:

One embodiment of a LIDAR system according to the present disclosure includes optical sources to emit a continuous-wave (CW) optical beam and a frequency-modulated continuous wave (FMCW) optical beam; first optical components coupled with the optical sources to generate a frequency-shifted CW local oscillator (LO) signal from the CW optical beam, to generate an FMCW LO signal from the FMCW optical beam, and to combine the CW optical beam and the FMCW optical beam into a combined optical beam; second optical components, coupled with the first optical components, to transmit the combined optical beam toward a target environment and to receive a target return signal from the target environment; and third optical components, coupled with the second optical components, to generate and detect a target velocity component of the target return signal and a target range component of the target return signal.

One embodiment of a method in a LIDAR system includes generating a continuous wave (CW) optical beam and a frequency modulated continuous-wave (FMCW) optical beam, sampling a CW local oscillator (LO) signal from the CW optical beam and an FMCW LO signal from the FMCW optical beam, frequency-shifting the CW LO signal, combining the CW optical beam and the FMCW optical beam into a combined optical beam, transmitting the combined optical beam toward a target environment, receiving a target return signal from the target environment; and extracting a target velocity component and a target range component from the target return signal.

These and other aspects of the present disclosure will be apparent from a reading of the following detailed description together with the accompanying figures, which are briefly described below. The present disclosure includes any combination of two, three, four or more features set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other example implementations, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

The present disclosure describes examples of LIDAR systems, and methods therein, that combine unmodulated continuous wave (CW) optical beams, and frequency-modulated continuous-wave (FMCW) optical beams, to scan a target environment and to generate target range and velocity components in a target return signal.

Figure 1:
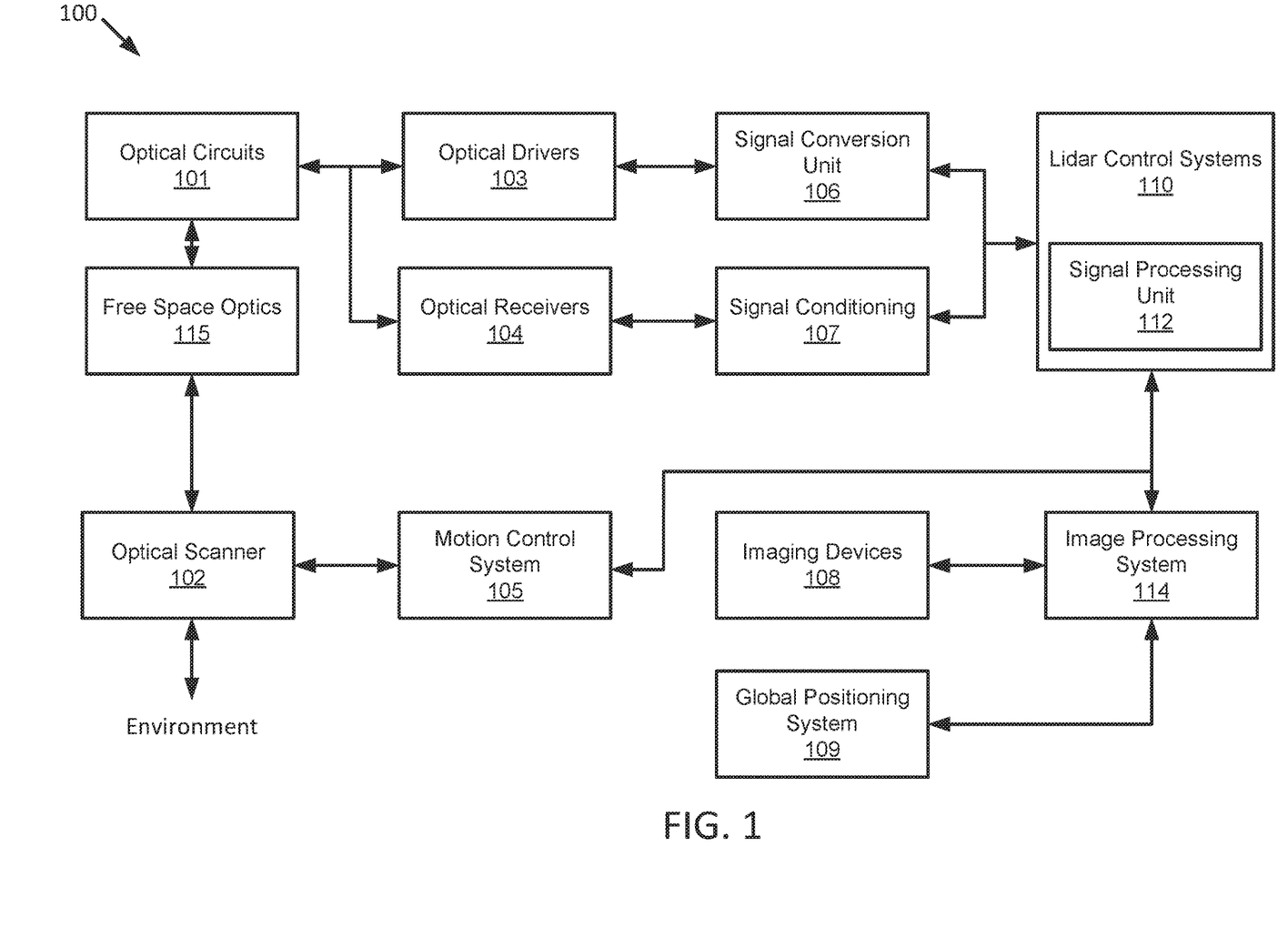
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101 implemented on a photonics chip. The optical circuits 101 may include a combination of active optical components and passive optical components. Active optical components may generate, amplify, or detect optical signals and the like. In some examples, the active optical circuit includes optical beams at different wavelengths, one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a digital signal processor. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment. In some example implementations, the system points multiple modulated and/or unmodulated optical beams to the same target.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control subsystem. The optical circuits may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometer (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2A:
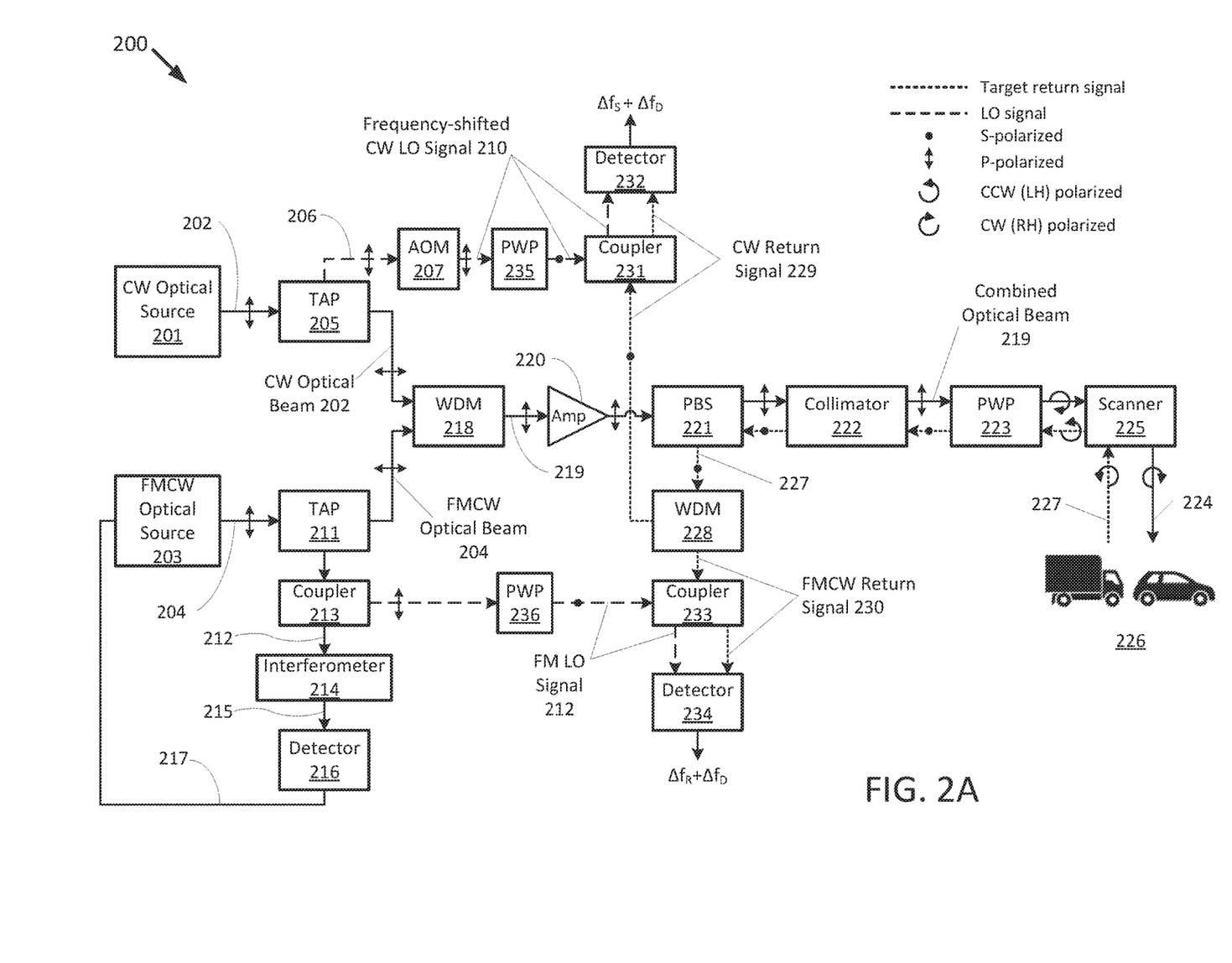
FIG. 2A is a block diagram illustrating an example LIDAR system in a first configuration according to the present disclosure.

FIG. 2A is a block diagram of an example LIDAR system 200. The system illustrated in FIG. 2A includes an optical source 201 that emits an unmodulated continuous-wave (CW) optical beam 202, and an optical source 203 that emits a frequency modulated CW (FMCW) optical beam 204. In the example of FIG. 2A, the CW optical beam 202 and the FMCW optical beam are co-polarized with p-polarization. However, in other examples, they may be cross-polarized or co-polarized with s-polarization, for example.

In one example, system 200 includes an optical tap 205 to sample the CW optical beam 202 to generate a CW local oscillator (LO) signal 206. The CW LO signal 206 is applied to a modulator 207, such as the acousto-optic modulator (AOM) illustrated in FIG. 2A. The modulator 207 is configured to frequency shift the CW LO signal 206 by an amount $\Delta f_s$ to generate a frequency-shifted CW LO signal 210 equal to $f_{CW}+\Delta f_s$. The frequency-shifted CW LO signal 210 is then passed through a polarization wave plate (PWP) 235 to convert the polarization, in this example, from p-polarization to s-polarization. The s-polarized, frequency shifted CW LO signal 210 is then received by optical coupler 231.

System 200 includes an optical tap 211 to sample the FMCW optical beam 204 to generate an FMCW LO signal 212. The FMCW LO signal 212 is applied to an optical coupler 213, which couples a portion of the FMCW LO signal 212 to an interferometer 214. Interferometer 214 may be, for example and without limitation, a Mach-Zehnder interferometer (MZI). The interferometer 214 is configured to generate a reference beat frequency signal 215 from the FMCW LO signal 212. A photodetector 216 is coupled to the interferometer to detect the reference beat frequency signal 215 and to generate a control signal 217 that may be used in a phase-locked loop (not shown) to control the modulation of FMCW optical source 203. The other output of optical coupler 213 is passed through a polarization wave plate 236 to convert the p-polarization of the FMCW LO signal 212 to s-polarization. The s-polarized FMCW LO signal 212 is then received by optical coupler 233.

In one example, the CW optical beam 202 and the FMCW optical beam 204 are combined in a combiner 218, such as the wavelength division multiplexer (WDM) 218 illustrated in FIG. 2A. The combined optical beam 219 is then amplified by amplifier (AMP) 220. In one example, the combined optical beam 219 is applied to a polarizing beam splitter (PBS) 221 that is configured to pass the polarization (e.g., p-polarization) of the combined optical beam 219. The combined optical beam 219 is then collimated by a collimator 222 coupled with the PBS 221.

In one example, system 200 may include a polarization wave plate (PWP) 223, which may be a quarter-wave plate or half-wave plate, to convert the polarization of the combined optical beam 219 to a circular polarization. In the example of FIG. 2A, the circular polarization is shown as a right-hand (RH) or clockwise (CW) circular polarization. The circularly polarized optical beam 224 is then directed to the target environment by optical scanner 225. In the example illustrated in FIG. 2A, the optical beam 224 illuminates the target 226, which reflects the optical beam as a target return signal 227. The principle component of the target return signal 227 will be a circularly polarized signal with the opposite polarization sense of the circularly polarized optical beam 224. In the example of FIG. 2A, the target return signal will have a left-hand (LH) or counterclockwise (CCW) circular polarization.

The target return signal 227 is de-scanned by the optical scanner 225 and transmitted through the PWP 223, where the circular polarization of the target return signal 227 is converted to s-polarization, cross-polarized with respect to the p-polarization of the combined optical beam 219. The target return signal 227 passes through the collimator 222 and is reflected by the PBS 221 to a wavelength division multiplexer (WDM) 228 that separates the target return signal 227 into a CW return signal 229 and an FMCW return signal 230.

In one example, optical coupler 231 receives the CW return signal 229 from WDM 228 and the frequency-shifted CW LO signal 210 from the modulator 207 and transmits the two signals to photodetector 232. As described in detail below, the output of photodetector 232 includes a beat frequency $f_{BEAT(CW)}$ equal to $\Delta f_S+\Delta f_D$, which is the difference between the frequency-shifted CW LO signal 210 and the Doppler shifted CW return signal 229. Since $\Delta f_S$ is known, it is a simple matter to determine the Doppler shift $\Delta f_D$, as illustrated by equation (1):

$$f_{BEAT(CW)} = (\Delta f_S + \Delta f_D) \rightarrow \Delta f_D = (\Delta f_S - f_{BEAT(CW)}) \quad (1)$$

Returning now to the example of FIG. 2A, the optical coupler 233 receives the FMCW return signal 230 from WDM 228 and the FMCW LO signal 212 from PWP 236 and transmits the two signals to photodetector 234. As described in greater detail below, the output of photodetector 234 is a beat frequency $f_{BEAT(FM)}$ between the FMCW LO signal 212 and the FMCW return signal 230. The beat frequency is the sum of a velocity component of the FMCW return signal 230, which is identical to the velocity component $\Delta f_D$ of the CW return signal, and a range component $\Delta f_R$ of the FMCW return signal 230. Since, $\Delta f_D$ is known from equation (1), above, it is a simple matter to determine $\Delta f_R$ illustrated in equation (2) below:

$$f_{BEAT(FM)} = (\Delta f_R, \Delta f_D) \rightarrow \Delta f_R = (f_{BEAT(FM)} - \Delta f_D) \quad (2)$$

Figure 2B:
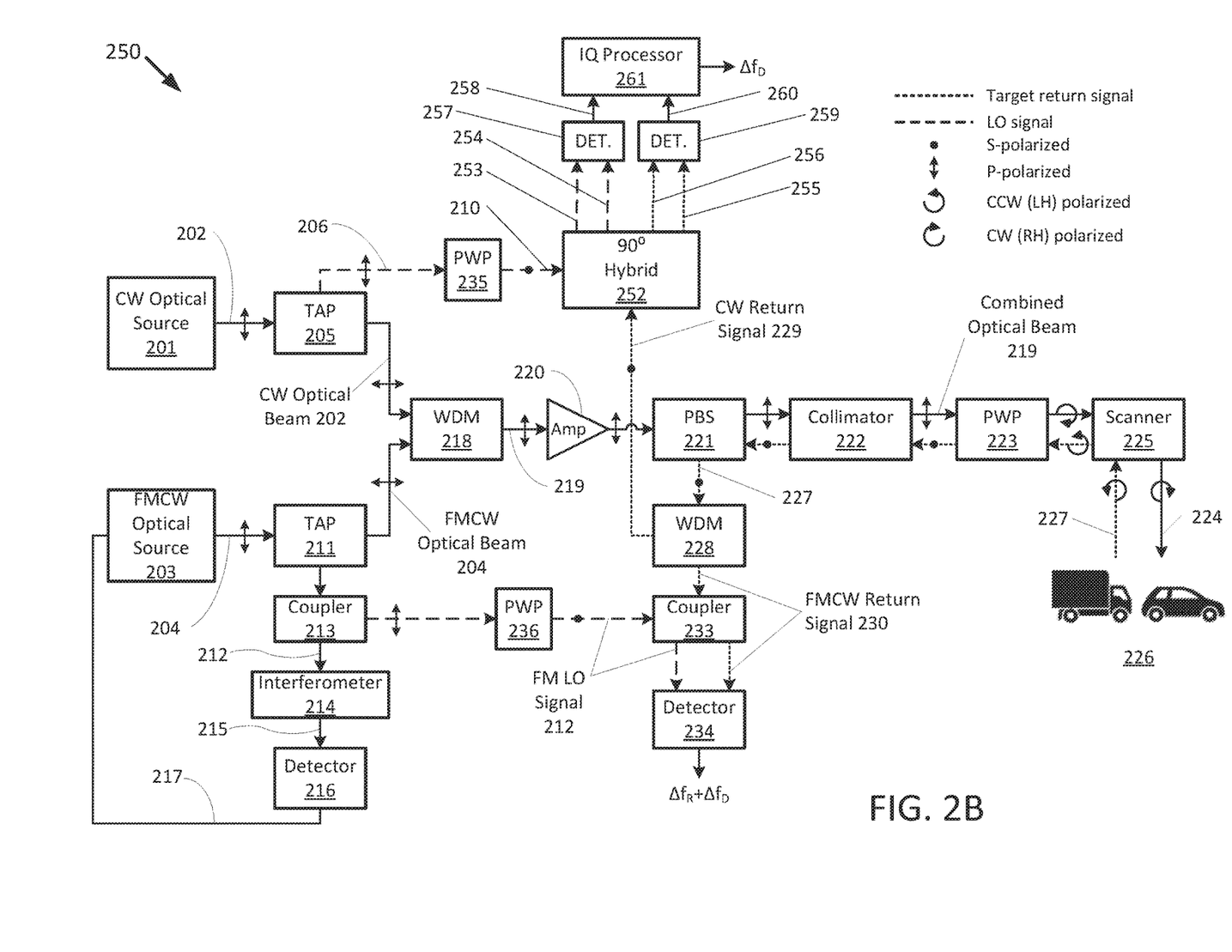
FIG. 2B is a block diagram illustrating an example LIDAR system in a second configuration according to the present disclosure.

FIG. 2B is a block diagram of an example LIDAR system 250. The system illustrated in FIG. 2B includes an optical source 201 that emits an unmodulated continuous-wave (CW) optical beam 202, and an optical source 203 that emits a frequency modulated CW (FMCW) optical beam 204. In the example of FIG. 2B, the CW optical beam 202 and the FMCW optical beam are co-polarized with p-polarization. However, in other examples, they may be cross-polarized or co-polarized with s-polarization, for example.

In one example, system 250 includes an optical tap 205 to sample the CW optical beam 202 to generate a CW local oscillator (LO) signal 206. The CW LO signal 206 is applied to a polarization wave plate (PWP) 235 as illustrated in FIG. 2B. The (PWP) 235 converts the polarization of the CW LO signal 206, in this example, from p-polarization to s-polarization. The s-polarized CW LO signal 210 is then received by 90° (quadrature) hybrid optical coupler 252.

System 250 includes an optical tap 211 to sample the FMCW optical beam 204 to generate an FMCW LO signal 212. The FMCW LO signal 212 is applied to an optical coupler 213, which couples a portion of the FMCW LO signal 212 to an interferometer 214. Interferometer 214 may be, for example and without limitation, a Mach-Zehnder interferometer (MZI). The interferometer 214 is configured to generate a reference beat frequency signal 215 from the FMCW LO signal 212. A photodetector 216 is coupled to the interferometer to detect the reference beat frequency signal 215 and to generate a control signal 217 that may be used in a phase-locked loop (not shown) to control the modulation of FMCW optical source 203. The other output of optical coupler 213 is passed through a polarization wave plate 236 to convert the p-polarization of the FMCW LO signal 212 to s-polarization. The s-polarized FMCW LO signal 212 is then received by optical coupler 233.

In one example, the CW optical beam 202 and the FMCW optical beam 204 are combined in a combiner 218, such as the wavelength division multiplexer (WDM) 218 illustrated in FIG. 2B. The combined optical beam 219 is then amplified by amplifier (AMP) 220. In one example, the combined optical beam 219 is applied to a polarizing beam splitter (PBS) 221 that is configured to pass the polarization (e.g., p-polarization) of the combined optical beam 219. The combined optical beam 219 is then collimated by a collimator 222 coupled with the PBS 221.

In one example, system 250 may include a polarization wave plate (PWP) 223, which may be a quarter-wave plate or half-wave plate, to convert the polarization of the combined optical beam 219 to a circular polarization. In the example of FIG. 2B, the circular polarization is shown as a right-hand (RH) or clockwise (CW) circular polarization. The circularly polarized optical beam 224 is then directed to the target environment by optical scanner 225. In the example illustrated in FIG. 2B, the optical beam 224 illuminates the target 226, which reflects the optical beam as a target return signal 227. The principle component of the target return signal 227 will be a circularly polarized signal with the opposite polarization sense of the circularly polarized optical beam 224. In the example of FIG. 2B, the target return signal will have a left-hand (LH) or counterclockwise (CCW) circular polarization.

The target return signal 227 is de-scanned by the optical scanner 225 and transmitted through the PWP 223, where the circular polarization of the target return signal 227 is converted to s-polarization, cross-polarized with respect to the p-polarization of the combined optical beam 219. The target return signal 227 passes through the collimator 222 and is reflected by the PBS 221 to a wavelength division multiplexer (WDM) 228 that separates the target return signal 227 into a CW return signal 229 and an FMCW return signal 230.

In one example, the 90° hybrid coupler 252 receives the CW return signal 229 from WDM 228 and combines it with the CW LO signal 210 from PWP 235. The output of the 90° hybrid coupler 252 includes four signals. Signal 253 is an in-phase (I) sum of the CW LO signal 210 and the CW return signal 229; signal 254 is an in-phase difference between the CW LO signal 210 and the CW return signal 229, which is equal to $\Delta f_D$ the Doppler frequency shift due to the relative target velocity; signal 255 is a quadrature phase (Q) sum of the CW LO signal 210 and the CW return signal 229; and signal 256 is a quadrature phase difference between the CW LO signal 210 and the CW return signal 229, which is equal to $\Delta f_D$ in phase quadrature. The in-phase sum and difference signals 253 and 254 are applied to a balanced photodetector 257, which generates an in-phase output signal 258. The quadrature phase sum and difference signals 255 and 256 are applied to balanced photodetector 259, which generates a quadrature phase output 260. In-phase signal 258 and quadrature signal 260 are processed by IQ processor 261 to generate the CW Doppler shift $\Delta f_D$.

Returning now to the example of FIG. 2B, the optical coupler 233 receives the FMCW return signal 230 from WDM 228 and the FMCW LO signal 212 from PWP 236 and transmits the two signals to photodetector 234. As described in greater detail below, the output of photodetector 234 is a beat frequency $f_{BEAT(FM)}$ between the FMCW LO signal 212 and the FMCW return signal 230. The beat frequency is the sum of a velocity component of the FMCW return signal 230, which is identical to the velocity component $\Delta f_D$ of the CW return signal, and a range component $\Delta f_R$ of the FMCW return signal 230. Since, $\Delta f_D$ is known from equation (1), above, it is a simple matter to determine $\Delta f_R$ illustrated in equation (3) below:

$$f_{BEAT(FM)} = (\Delta f_R + \Delta f_D) \rightarrow \Delta f_R = (f_{BEAT(FM)} - \Delta f_D) \quad (3)$$

Figure 3A:
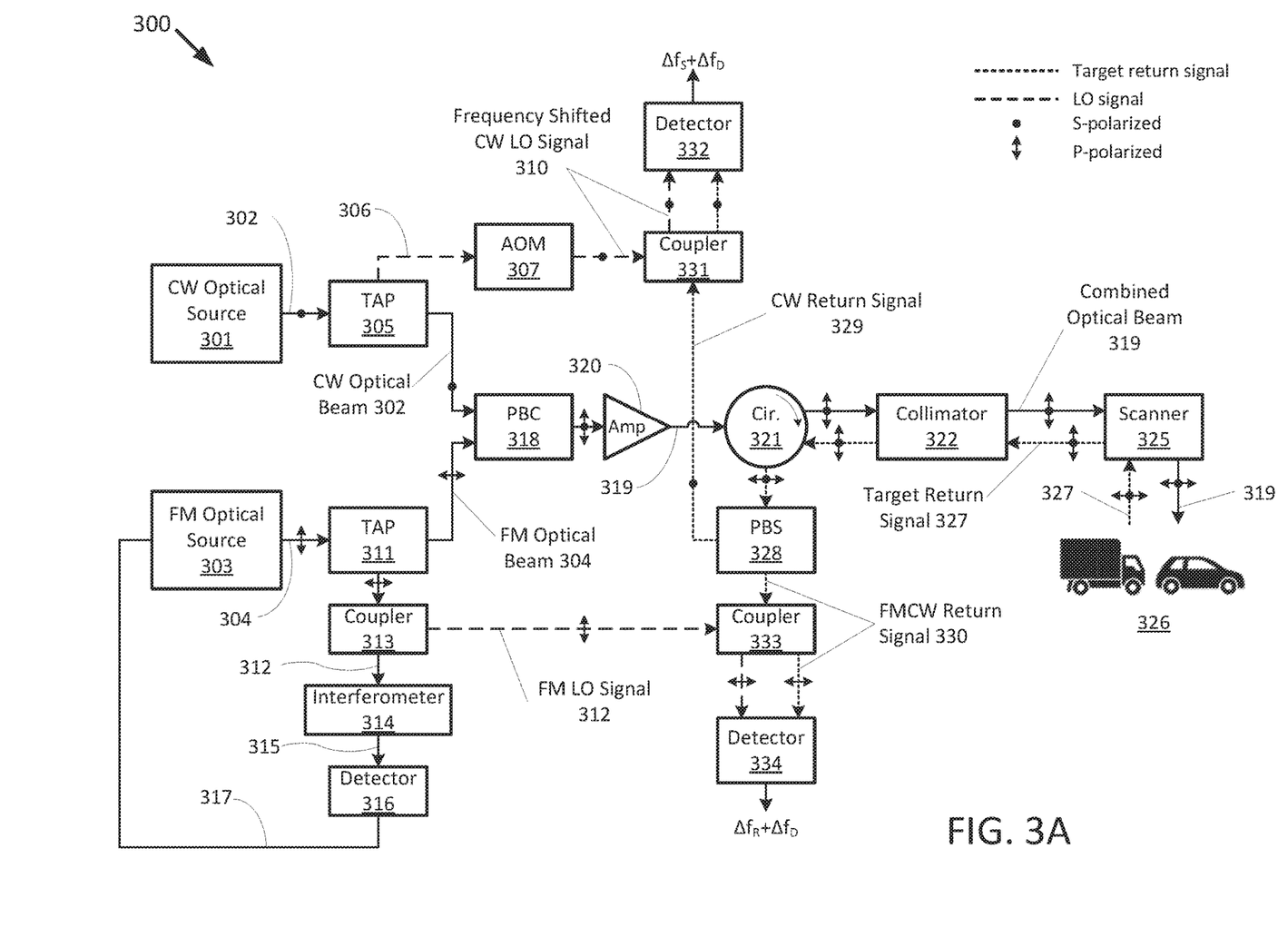
FIG. 3A is a block diagram illustrating an example LIDAR system in a third configuration according to the present disclosure.

FIG. 3A is a block diagram of an example LIDAR system 300. The system illustrated in FIG. 3A includes an optical source 301 that emits an unmodulated continuous-wave (CW) optical beam 302, and an optical source 303 that emits a frequency modulated CW (FMCW) optical beam 304. In the example of FIG. 3A, the CW optical beam 302 and the FMCW optical beam 304 are cross-polarized with s-polarization and p-polarization respectively. However, in other examples, the polarizations may be interchanged or may be co-polarized.

In one example, system 300 includes an optical tap 305 to sample the CW optical beam 302 to generate a CW local oscillator (LO) signal 306. The CW LO signal 306 is applied to a modulator 307, such as the acousto-optic modulator (AOM) illustrated in FIG. 3. The modulator 307 is configured to frequency shift the CW LO signal 306 to generate a frequency-shifted CW LO signal 310 that is received at one input of optical coupler 331.

System 300 includes an optical tap 311 to sample the FMCW optical beam 304 to generate an FMCW LO signal 312. The FMCW LO signal 212 is applied to an optical coupler 313, which couples a portion of the FMCW LO signal 312 to an interferometer 314. Interferometer 314 may be, for example and without limitation, a Mach-Zehnder interferometer (MZI). The interferometer 314 is configured to generate a reference beat frequency signal 315 from the FMCW LO signal 312. A photodetector 316 is coupled to the interferometer to detect the reference beat frequency signal 315 and to generate a control signal 317 that may be used in a phase-locked loop (not shown) to control the modulation of FMCW optical source 303. The FMCW LO signal 312 is also transmitted to one input of optical coupler 333.

In one example, the CW optical beam 302 and the FMCW optical beam 304 are combined in a polarizing beam combiner (PBC) 318 into a combined optical beam 319. The combined optical beam 319 is then amplified by amplifier (AMP) 320. In one example, the combined optical beam 319 is applied to an optical circulator 321 that directs the combined optical beam 319 to a collimator 322 where the combined optical beam 319 is collimated.

The combined optical beam 319 is then directed to the target environment by optical scanners 325. In the example illustrated in FIG. 3A, the combined optical beam 319 illuminates the target 326, which reflects the optical beam as a target return signal 327.

The target return signal 327 is de-scanned by the optical scanner 325 and transmitted through the collimator 322 and is directed by circulator 321 to a polarizing beam splitter (PBS) 328 that separates the target return signal 327 into a CW return signal 329 and a FMCW return signal 330.

In one example, the optical coupler 331 receives the CW return signal 329 from PBS 328 and the frequency-shifted CW LO signal 310 from the modulator 307 and transmits the two signals to photodetector 332. As described in detail below, the output of photodetector 332 includes a beat frequency $f_{BEAT(CW)}$ equal to $\Delta f_S + \Delta f_D$, the difference between the frequency-shifted CW LO signal 310 and the Doppler shifted of the CW return signal 329. Since $\Delta f_S$ is known, it is a simple matter to determine the Doppler shift $\Delta f_D$, as illustrated by equation (1) above with respect to system 200.

Returning to FIG. 3A, optical coupler 333 receives the FMCW return signal 330 from PBS 328 and the FMCW LO signal 312 from optical coupler 313 and transmits the two signals to photodetector 334. The output of photodetector 334 is a beat frequency $f_{BEAT(FM)}$ between the FMCW LO signal 312 and the FMCW return signal 330. The beat frequency is the sum of a velocity component of the FMCW return signal 330, which is identical to the velocity component $\Delta f_D$ of the CW return signal 329, and a range component $\Delta f_R$ of the FMCW return signal 330. As described above with respect to system 200 of FIG. 2A, it will be appreciated that after obtaining the velocity component $\Delta f_D$ from the CW return signal 329, the range component $\Delta f_R$ of FMCW return signal 330 can be obtained by a simple subtraction, as illustrated in equation (2) above.

Figure 3B:
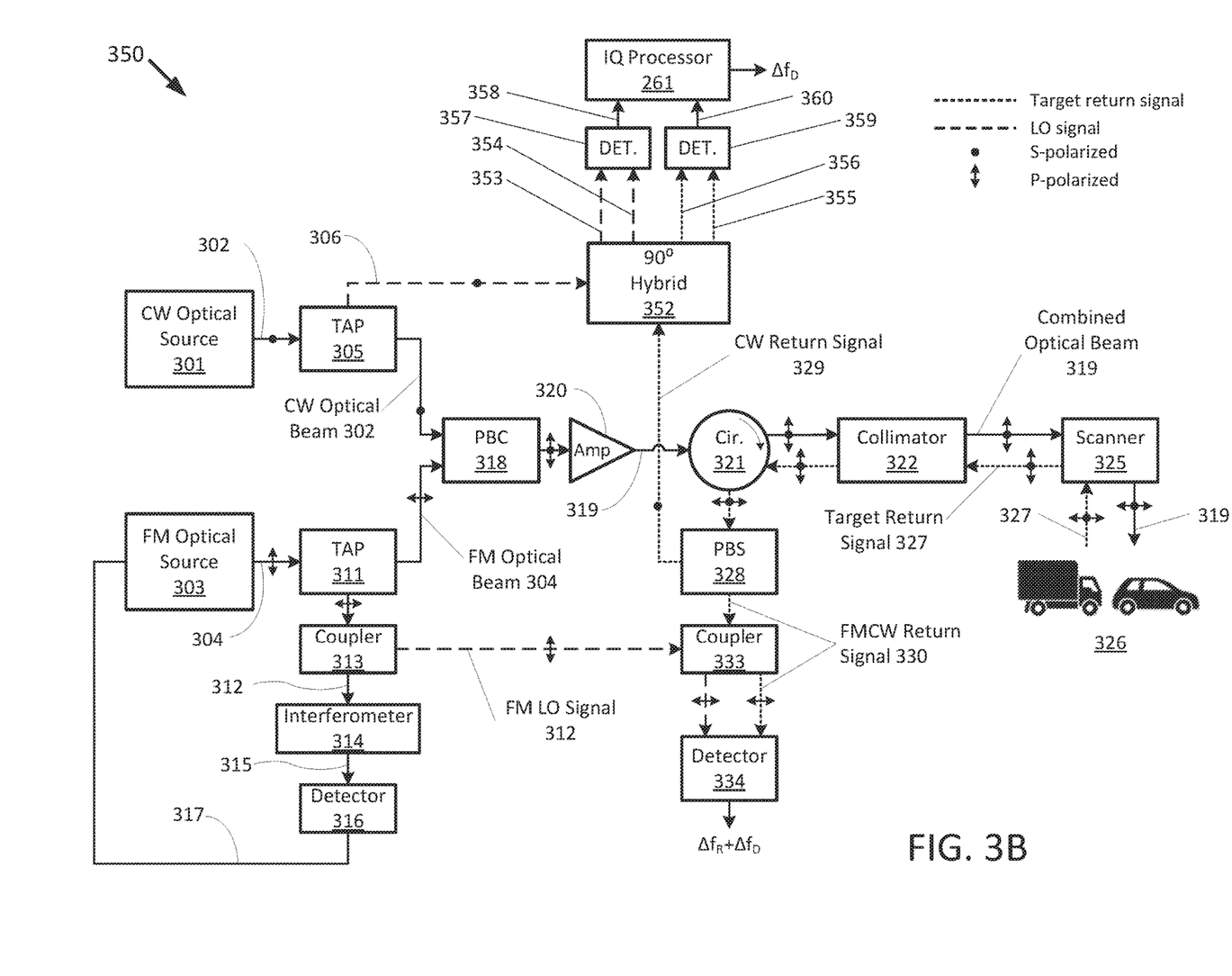
FIG. 3B is a block diagram illustrating an example LIDAR system in a fourth configuration according to the present disclosure.

FIG. 3B is a block diagram of an example LIDAR system 350. The system illustrated in FIG. 3B includes an optical source 301 that emits an unmodulated continuous-wave (CW) optical beam 302, and an optical source 303 that emits a frequency modulated CW (FMCW) optical beam 304. In the example of FIG. 3B, the CW optical beam 302 and the FMCW optical beam 304 are cross-polarized with s-polarization and p-polarization respectively. However, in other examples, the polarizations may be interchanged or may be co-polarized.

In one example, system 350 includes an optical tap 305 to sample the CW optical beam 302 to generate a CW local oscillator (LO) signal 306. The CW LO signal 306 a 90° (quadrature) hybrid optical coupler 352, described in greater detail below.

System 350 includes an optical tap 311 to sample the FMCW optical beam 304 to generate an FMCW LO signal 312. The FMCW LO signal 212 is applied to an optical coupler 313, which couples a portion of the FMCW LO signal 312 to an interferometer 314. Interferometer 314 may be, for example and without limitation, a Mach-Zehnder interferometer (MZI). The interferometer 314 is configured to generate a reference beat frequency signal 315 from the FMCW LO signal 312. A photodetector 316 is coupled to the interferometer to detect the reference beat frequency signal 315 and to generate a control signal 317 that may be used in a phase-locked loop (not shown) to control the modulation of FMCW optical source 303. The FMCW LO signal 312 is also transmitted to one input of optical coupler 333.

In one example, the CW optical beam 302 and the FMCW optical beam 304 are combined in a polarizing beam combiner (PBC) 318 into a combined optical beam 319. The combined optical beam 319 is then amplified by amplifier (AMP) 320. In one example, the combined optical beam 319 is applied to an optical circulator 321 that directs the combined optical beam 319 to a collimator 322 where the combined optical beam 319 is collimated.

The combined optical beam 319 is then directed to the target environment by optical scanners 325. In the example illustrated in FIG. 3B, the combined optical beam 319 illuminates the target 326, which reflects the optical beam as a target return signal 327.

The target return signal 327 is de-scanned by the optical scanner 325 and transmitted through the collimator 322 and is directed by circulator 321 to a polarizing beam splitter (PBS) 328 that separates the target return signal 327 into a CW return signal 329 and a FMCW return signal 330.

In one example, the 90° hybrid coupler 352 receives the CW return signal 229 from WDM 228 and combines it with the CW LO signal 306 from optical tap 305. The output of the 90° hybrid coupler 352 includes four signals. Signal 353 is an in-phase (I) sum of the CW LO signal 306 and the CW return signal 329; signal 354 is an in-phase difference between the CW LO signal 306 and the CW return signal 329, which is equal to $\Delta f_D$, the Doppler frequency shift due to the relative target velocity; signal 355 is a quadrature phase (Q) sum of the CW LO signal 306 and the CW return signal 329; and signal 356 is a quadrature phase difference between the CW LO signal 306 and the CW return signal 329, which is equal to $\Delta f_D$ in phase quadrature. The in-phase sum and difference signals 353 and 354 are applied to a balanced photodetector 357, which generates an in-phase output signal 358. The quadrature phase sum and difference signals 355 and 356 are applied to balanced photodetector 359, which generates a quadrature phase output 360. In-phase signal 358 and quadrature signal 360 are processed by IQ processor 361 to generate the CW Doppler shift $\Delta f_D$.

Returning to FIG. 3B, optical coupler 333 receives the FMCW return signal 330 from PBS 328 and the FMCW LO signal 312 from optical coupler 313 and transmits the two signals to photodetector 334. The output of photodetector 334 is a beat frequency $f_{BEAT(FM)}$ between the FMCW LO signal 312 and the FMCW return signal 330. The beat frequency is the sum of a velocity component of the FMCW return signal 330, which is identical to the velocity component $\Delta f_D$ of the CW return signal 329, and a range component $\Delta f_R$ of the FMCW return signal 330. As described above with respect to system 200 of FIG. 2A, it will be appreciated that after obtaining the velocity component $\Delta f_D$ from the CW return signal 329, the range component $\Delta f_R$ of FMCW return signal 330 can be obtained by a simple subtraction, as illustrated in equation (2) above.

Figure 4:
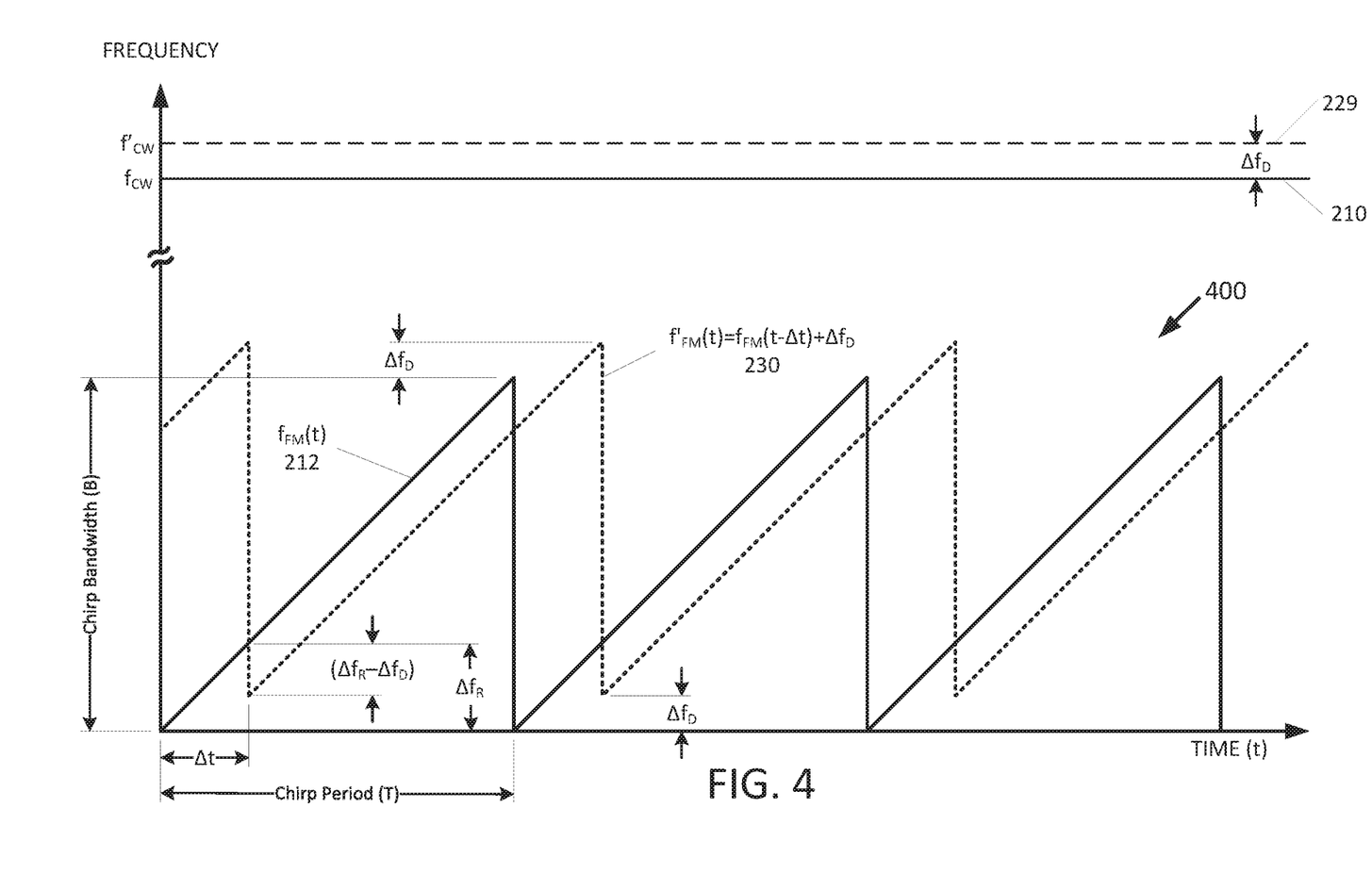
FIG. 4 is a time-frequency diagram illustrating one example of LIDAR waveforms according to the present disclosure.

FIG. 4 is a time-frequency diagram 400 that illustrates examples of waveforms that may be used in the example systems 200 and 250 of FIGS. 2A and 2B, and the example systems 300 and 350 of FIGS. 3A and 3B. For clarity of explanation, numerical reference identifiers used in FIG. 4 are taken from the description of FIG. 2A.

In FIG. 4, the frequency of the CW LO signal 210 is identified as $f_{CW}$ and the frequency of the CW target return signal 229 is labeled $f_{CW'}$. The frequency difference between the two signals is the Doppler shift, $\Delta f_D$, due to the relative velocity of the target. The relationship between the Doppler shift ($\Delta f_D$) and the target velocity (V) is given by equation (3) below:

$$V = \Delta f_D \frac{\lambda_{cw}}{2} \quad (3)$$

where $\lambda_{cw}$ is the wavelength of the CW beam 202. The Doppler shift and the relative velocity of the target can be positive or negative, depending on whether the target is approaching or receding. In the example of FIG. 4, the positive Doppler shift indicates an approaching target.

Note that in FIG. 4, the CW LO signal 210 and the CW target return signal 229 are outside the frequency range (equivalently, the wavelength range) of FMCW LO signal 212 and FMCW return signal 230. This separation is required in systems 200 and 250, because these systems separate the CW and FMCW signals using wave division multiplexing. In contrast, there is no constraint on the relative wavelengths of the CW and FMCW signals in systems 300 and 350 because these systems separate the CW and FMCW signals based on polarization, which is independent of wavelength. Accordingly, in systems 300 and 350, the frequency (wavelength) of the CW signals may lie either within or without the wavelength range of the FMCW signals.

FIG. 4 also illustrates one example of the modulation on FMCW LO signal 212, labeled as $f_{FM}$ (t), and the FMCW return signal 230, labeled as $f_{FM'}$ (t). As shown in FIG. 4, the waveform of the return signal 230 is a time delayed version of the waveform of the FMCW LO signal 212 with an offset equal to the Doppler shift associated with the velocity of the target, as described above. The frequency modulation used in FIG. 4 is sawtooth modulation, where the frequency is linearly swept between a lower frequency and an upper frequency. The frequency span between the lower and upper frequencies is the chirp bandwidth B. The duration of the sweep is the chirp period T. The slope of the sawtooth is the chirp rate k=B/T.

The delay between the waveform of the FMCW LO signal 212 and the waveform of the FMCW return signal 230 is $\Delta t$, which is the round-trip time to and from the target. The frequency difference between the transmitted LO waveform 212 and the returned waveform 230, due to target range, is given by $\Delta f_R$=k $\Delta t$, but, as noted above, the return signal also has the same Doppler shift as the CW return signal 229, which can increase or decrease the frequency difference depending on whether the target is approaching or receding. As noted above, in the example of FIG. 4, the positive Doppler shift indicates an approaching target, and decreases the frequency difference for the sawtooth waveform.

Figure 5:
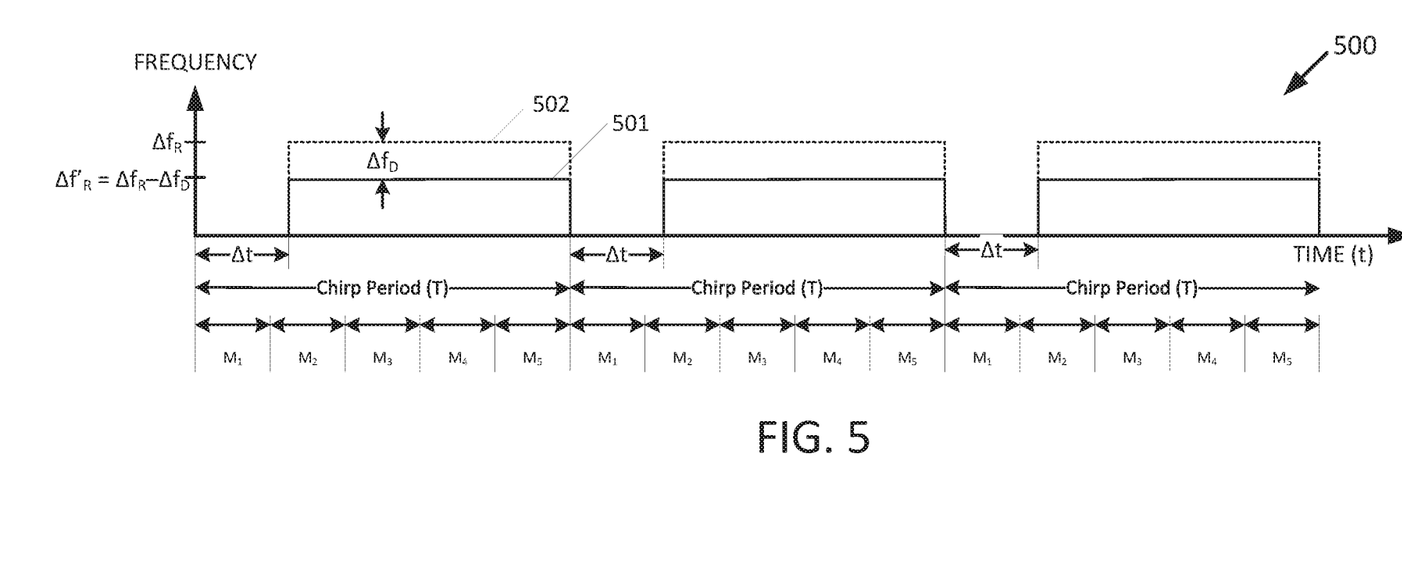
FIG. 5 is a time-frequency diagram illustrating one example of LIDAR waveforms according to the present disclosure.

This effect is illustrated in FIG. 5, a time-frequency diagram 500 which plots the frequency difference between the LO signal waveform 212 and the return signal waveform 230. In FIG. 5, the solid line 501 illustrates the measured or apparent value of the frequency difference $\Delta f'_R$, due to the Doppler shift $\Delta f_D$, while the dashed line 502 illustrates the actual range related frequency difference $\Delta f_R$.

In the absence of a Doppler shift, the target range can be calculated from equation (4) as:

$$R=\Delta f_R(c/2k) \quad (4)$$

Knowing the Doppler shift from a measurement of the CW return signal 229, the target range can be determined from equation (5) as:

$$R=(\Delta f'_R+\Delta f_D)(c/2k) \quad (5)$$

Also illustrated in FIG. 5 are multiple measurement time slots $M_n$ during each chirp that can be used to resolve velocity and range changes during the sweep.

Figure 6:
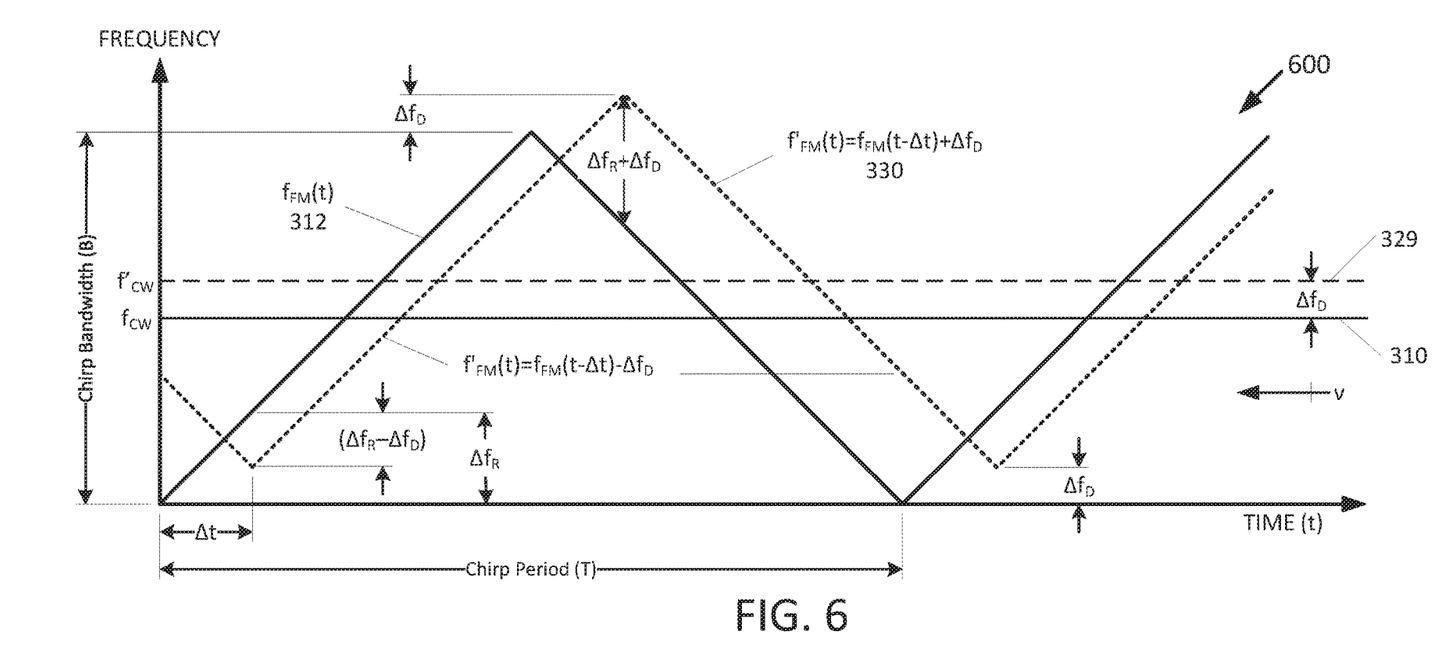
FIG. 6 is a time-frequency diagram illustrating one example of LIDAR waveforms according to the present disclosure.
Figure 7:
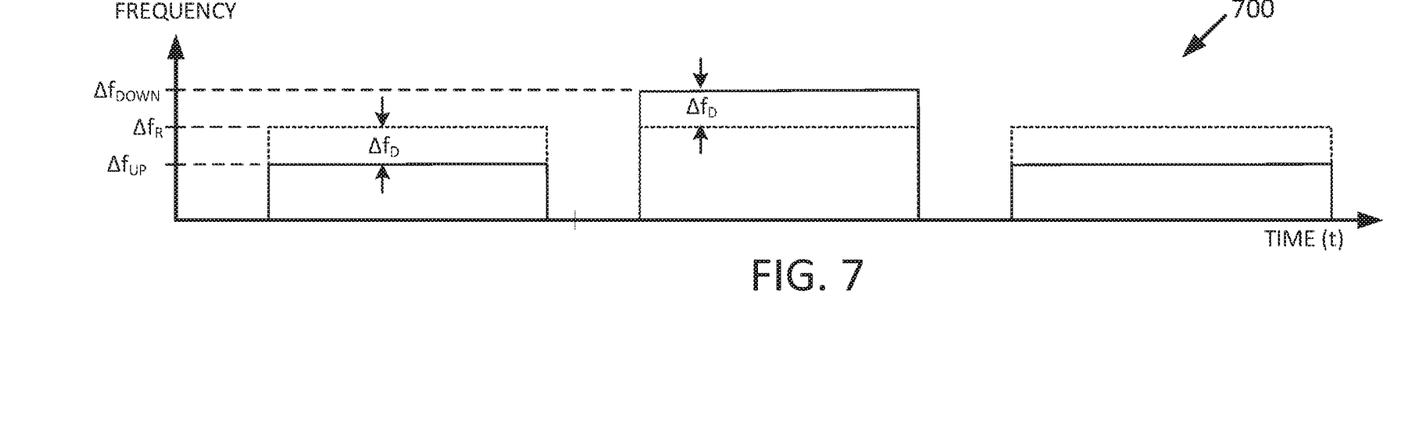
FIG. 7 is a time-frequency diagram illustrating one example of LIDAR waveforms according to the present disclosure.

FIG. 6 is a time-frequency diagram 600 illustrating a triangle modulation scheme. For convenience, the illustrated waveforms correspond to systems 300 and 350, where the frequencies of the CW and FMCW signals can overlap due to polarization diversity as described above. As illustrated in FIG. 6, during the frequency upsweep (up-chirp) portion of the waveform, the frequency difference $\Delta f_{UP}$ between the LO waveform 312 and the return signal waveform 330 due to range is decreased by the Doppler shift $\Delta f_D$ (assuming a positive Doppler shift), just as in the case of the sawtooth modulation of FIG. 4. However, during the frequency downsweep (down-chirp) portion of the waveform, the frequency difference $\Delta f_{DOWN}$ between the transmitted waveform 312 and the returned waveform 330 due to range is increased by the Doppler shift $\Delta f_D$. This effect is also illustrated in FIG. 7, a time-frequency diagram 700 that plots the frequency difference $\Delta f_{CHIRP}$ between the transmitted waveform 304 and the returned waveform 330.

As described above, $\Delta f_D$ can be determined independently from the beat frequency between the CW signals 329 and 310, so it is a simple matter to calculate $\Delta f_R$ on either the up-chirp or the down-chirp as shown in equations (6) and (7):

$$\Delta f_R=\Delta f_{UP}+\Delta f_D \quad (6)$$

$$\Delta f_R=\Delta f_{DOWN}-\Delta f_D \quad (7)$$

Figure 8:
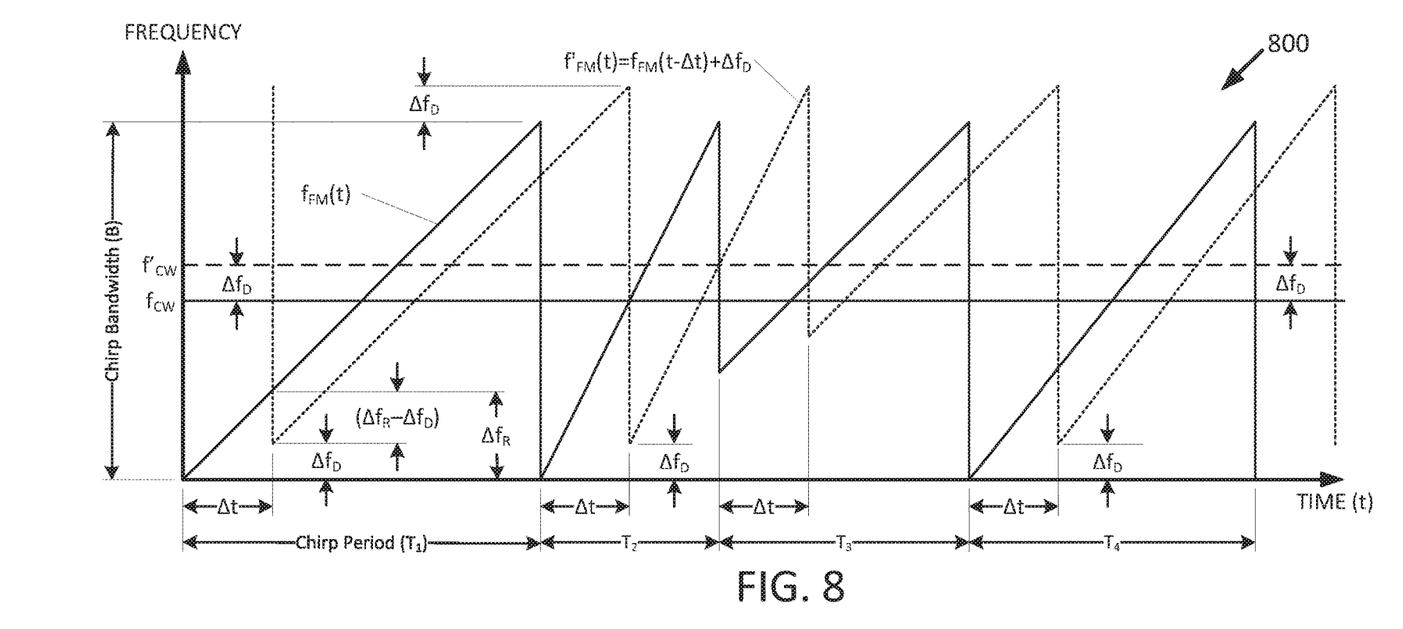
FIG. 8 is a time-frequency diagram illustrating one example of LIDAR waveforms according to the present disclosure.
Figure 9:
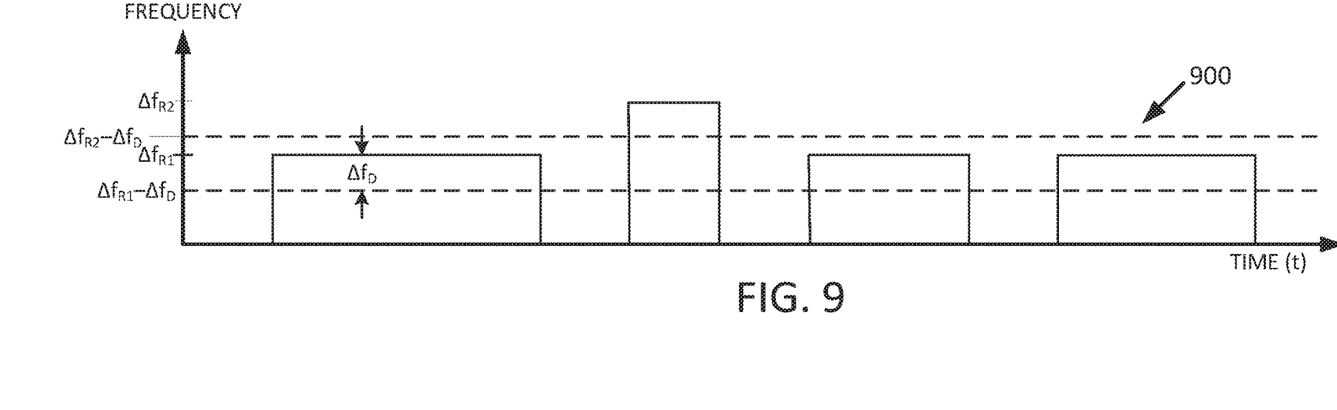
FIG. 9 is a time-frequency diagram illustrating one example of LIDAR waveforms according to the present disclosure.

FIG. 8 is a time-frequency diagram 800 illustrating an asymmetric sawtooth modulation scheme with variations in chirp bandwidth and chirp duration and chirp slope from chirp to chirp. All other notation is the same as that used in FIGS. 4 through 7. Variations in these chirp parameters can be used to compensate for system characteristics. For example, the chirp bandwidth can be reduced to compensate for a detector with bandwidth limitations as illustrated in the chirp waveform during chirp period $T_3$ in FIG. 8. Alternatively, the chirp rate can be reduced to achieve the same compensation. Changes in chirp rate, as illustrated in chirp period $T_2$ of FIG. 8, can be used to increase range resolution.

Figure 10:
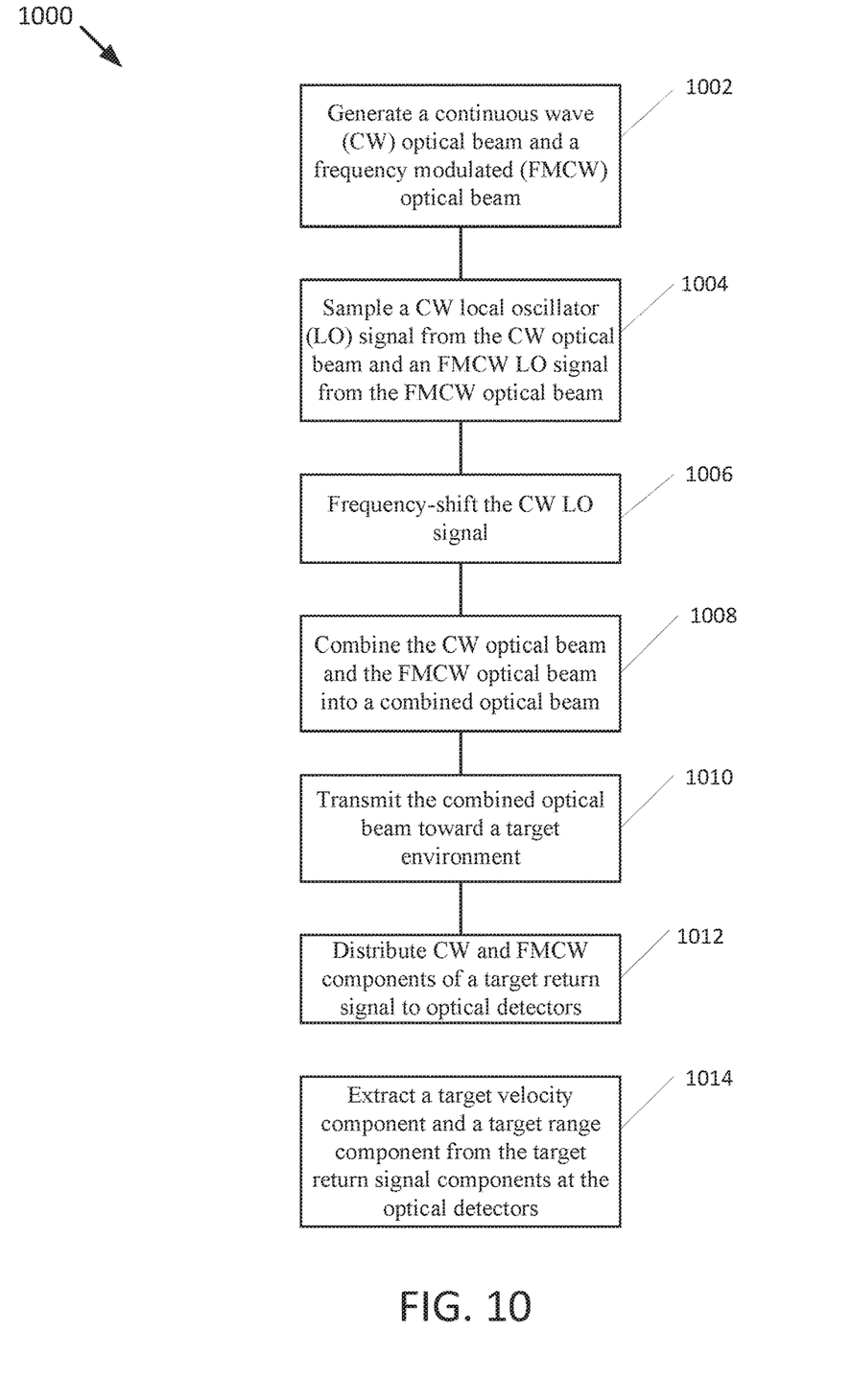
FIG. 10 is a flow diagram illustrating an example method in a LIDAR system according to the present disclosure.

FIG. 10 is a flow diagram illustrating an example method 1000 in a LIDAR system such as example systems 200, 250, 300 and 350. With reference to system 300, method 1000 begins at block 1002, where a continuous wave (CW) optical beam (e.g., 302), is generated by a CW optical source (301), and an FMCW optical beam (e.g., 304) is generated by an FMCW optical source (e.g., 303).

In block 1004, a CW local oscillator signal (306) is sampled from the CW optical beam (e.g., 302), for example by optical tap 305; and an FMCW LO signal (e.g., 312) is sampled from optical beam 304, for example by optical tap 311.

In block 1006, the CW LO signal (e.g., 312), is frequency-shifted, for example by modulator 307.

In block 1008, the CW optical beam (e.g., 302) and the FMCW optical beam (e.g., 304) are combined in a combiner such as PBC 318.

In block 1010, the combined signal (e.g., 319) is transmitted toward a target environment, for example through circulator 321, collimator 322, and scanner 325.

In block 1012, a CW component (e.g., 329) of a target return signal, such as target return signal 327, is distributed to an optical detector (e.g., 332), and an FMCW component of the target return signal (e.g., 330) is distributed to an optical detector (e.g., 334), for example through PBS 328, coupler 333 and coupler 331; and an FMCW component (e.g., 330) of the target return signal (e.g., 327) is distributed to an optical detector (e.g., 334), for example through PBS 328 and coupler 333.

Finally, in block 1014, a target velocity component is extracted from the CW component (e.g., 329) and a target range component is extracted from the FMCW component (e.g., 330) at the optical detectors (e.g., 332 and 334, respectively).

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Any reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
    optical sources to emit a continuous-wave (CW) optical beam and a frequency-modulated CW (FMCW) optical beam;
    an acousto-optic modulator (AOM) coupled with the optical sources to generate a frequency-shifted CW local oscillator (LO) signal from the CW optical beam;
    a first optical coupler to generate an FMCW LO signal from the FMCW optical beam;
    a first optical component to combine the CW optical beam and the FMCW optical beam into a combined optical beam;
    second optical components to receive the combined optical beam, to transmit the combined optical beam toward a target environment, and to receive a target return signal from the target environment; and
    a second optical coupler to combine a CW return signal with the frequency-shifted CW LO signal;
    a first photodetector to detect a velocity component of the target return signal;
    a third optical coupler to combine a FMCW return signal with the FMCW LO signal; and
    a second photodetector to detect a range component and the velocity component of the target return signal.

2. The system of claim 1, further comprising:
    optical taps to sample the CW optical beam and the FMCW optical beam;
    a first polarization wave plate (PWP) to convert a first polarization of the frequency-shifted CW LO signal to a second polarization;
    a second PWP to convert the FMCW LO signal from the first polarization to the second polarization; and
    an optical amplifier, coupled with the first WDM, to amplify the combined optical beam, wherein the first optical component is a wavelength division multiplexer (WDM) coupled with the optical taps to combine the CW optical beam and the FMCW optical beam into the combined optical beam with the first polarization.

3. The system of claim 2, wherein the second optical components comprise:
a polarizing beam splitter (PBS) coupled with the optical amplifier;
a collimator coupled with the beam splitter to collimate the combined optical beam and the target return signal;
a third polarization wave plate (PWP) to convert the first polarization of the combined optical beam to a third polarization, and to convert a fourth polarization of the target return signal to the second polarization; and
a scanner coupled with the collimator to scan the target environment with the combined optical beam and to de-scan the target return signal.

4. The system of claim 3, further comprising:
a second WDM coupled with the PBS to separate the target return signal into the CW return signal and the FMCW return signal.

5. The system of claim 4, further comprising:
an interferometer coupled to the first optical coupler to generate a reference beat frequency signal from the FMCW LO signal; and
a third photodetector coupled to the interferometer to detect the beat frequency signal.

6. The system of claim 1, wherein the CW optical beam and the FMCW optical beam are co-polarized.

7. The system of claim 1, wherein the FMCW optical beam is one of sawtooth modulated, triangle modulated and asymmetrically modulated.

8. The system of claim 1, wherein the first optical component comprises a polarizing beam combiner (PBC), the system further comprising:
optical taps to sample the CW optical beam and the FMCW optical beam; and
an optical amplifier, coupled with the combiner, to amplify the combined optical beam.

9. The system of claim 8, wherein the second optical components comprise:
an optical circulator coupled with the optical amplifier;
a collimator coupled with the optical circulator to collimate the combined optical beam and the target return signal; and
a scanner coupled with the collimator to scan the target environment and to de-scan the target return signal.

10. The system of claim 9, wherein the CW optical beam and the FMCW optical beam are cross-polarized, and wherein the CW optical beam and the FMCW optical beam overlap in frequency.

11. The system of claim 9, further comprising:
a polarizing beam splitter (PBS) coupled with the optical circulator to separate the target return signal into the CW return signal and the FMCW return signal.

12. The system of claim 11, further comprising:
an interferometer coupled to the first optical coupler to generate a reference beat frequency signal from the FMCW LO signal; and
a third photodetector coupled to the interferometer to detect the beat frequency signal.

13. A method for light detection and ranging (LIDAR), comprising:
generating a continuous wave (CW) optical beam and a frequency modulated CW (FMCW) optical beam;
sampling a CW local oscillator (LO) signal from the CW optical beam and an FMCW LO signal from the FMCW optical beam;
frequency-shifting the CW LO signal;
combining the CW optical beam and the FMCW optical beam into a combined optical beam;
transmitting the combined optical beam toward a target environment;
distributing CW and FMCW components of a target return signal to optical detectors;
combining a CW return signal with the frequency-shifted CW LO signal in a first optical coupler;
detecting a beat frequency corresponding to a velocity component of the target return signal;
combining a FMCW return signal with the FMCW LO signal in a second optical coupler; and
detecting a beat frequency corresponding to a range component and the velocity component of the target return signal.

14. The method of claim 13, wherein combining the CW optical beam and the FMCW optical beam into a combined optical beam comprises providing the CW optical beam and the FMCW optical beam to a first wave division multiplexer (WDM).

15. The method of claim 14, wherein transmitting the combined optical beam toward the target environment comprises:
passing the combined optical beam through a polarizing beam splitter (PBS);
collimating the combined optical beam with a collimator; and
scanning the target environment with an optical scanner.

16. The method of claim 15, wherein receiving the target return signal comprises:
de-scanning the target return signal with the optical scanner;
collimating the target return signal with the collimator; and
directing the target return signal with the PBS to a second WDM.

17. The method of claim 16, further comprising:
receiving the target return signal from the PBS at the second WDM;
splitting the target return signal with the second WDM into the CW return signal and the FMCW return signal.

18. The method of claim 13, wherein combining the CW optical beam and the FMCW optical beam into a combined optical beam comprises providing the CW optical beam and the FMCW optical beam to a polarizing beam combiner (PBC).

19. The method of claim 18, wherein transmitting the combined optical beam toward a target environment comprises:
passing the combined optical beam through an optical circulator;
collimating the combined optical beam with a collimator; and
scanning the target environment with an optical scanner.

20. The method of claim 19, wherein receiving the target return signal comprises:
de-scanning the target return signal with the optical scanner;
collimating the target return signal with the collimator; and
directing the target return signal with the optical circulator to a polarizing beam splitter (PBS).

21. The method of claim 20, further comprising:
receiving the target return signal from the optical circulator at a polarizing beam splitter (PBS);
splitting the target return signal, with the WDM, into the CW return signal and the FMCW return signal.

22. A light detection and ranging (LIDAR) system, comprising:
- optical sources to emit a continuous-wave (CW) optical beam and a frequency-modulated CW (FMCW) optical beam with a first polarization;
- first optical components coupled with the optical sources to generate a CW local oscillator (LO) signal from the CW optical beam, to generate an FMCW LO signal from the FMCW optical beam, and to combine the CW optical beam and the FMCW optical beam into a combined optical beam;
- second optical components, coupled with the first optical components, to transmit the combined optical beam toward a target environment and to receive a target return signal from the target environment; and
- third optical components, coupled with the second optical components, to generate and detect a target velocity component of the target return signal and a target range component of the target return signal, wherein the third optical components comprise:
  - a hybrid coupler to combine the CW return signal with the CW LO signal to generate in-phase (I) and quadrature (Q) sum and difference signals;
  - balanced photodetectors to generate in-phase and quadrature components of the velocity component of the target return signal;
  - an I/Q processor to extract the velocity component of the target return signal;
  - a first optical coupler to combine the FMCW return signal with the FMCW LO signal; and
  - a photodetector to detect the target range component and the velocity component of the target return signal.

23. The system of claim 22, wherein the first optical components comprise:
- optical taps to sample the CW optical beam and the FMCW optical beam;
- a first polarization wave plate (PWP) to convert the first polarization of the sampled CW optical beam to the CW LO signal with a second polarization;
- a second optical coupler to generate the FMCW LO signal from the sampled FMCW optical beam;
- a second PWP to convert the FMCW LO signal from the first polarization to the second polarization;
- a first wavelength division multiplexer (WDM) coupled with the optical taps, to combine the CW optical beam and the FMCW optical beam into the combined optical beam with the first polarization; and
- an optical amplifier, coupled with the first WDM, to amplify the combined optical beam.

24. The system of claim 23, wherein the second optical components comprise:
- a polarization beam splitter (PBS) coupled with the optical amplifier, to direct the combined optical beam toward the target environment and to direct the target return signal toward the third optical components;
- a collimator coupled with the beam splitter to collimate the combined optical beam and the target return signal;
- a polarization wave plate (PWP) to convert the first polarization of the combined optical beam to a third polarization, and to convert a fourth polarization of the target return signal to the second polarization; and
- a scanner coupled with the collimator to scan the target environment with the combined optical beam and to de-scan the target return signal.

25. The system of claim 24, wherein the third optical components further comprise:
- a second WDM coupled with the PBS to separate the target return signal into a CW return signal and an FMCW return signal.

26. The system of claim 22, wherein the first optical components comprise:
- optical taps to sample the CW optical beam and the FMCW optical beam, wherein the sampled CW optical beam comprises the CW LO signal;
- a second optical coupler to generate the FMCW LO signal from the sampled FMCW optical beam;
- a polarizing beam combiner (PBC), coupled with the optical taps, to combine the CW optical beam and the FMCW optical beam into the combined optical beam; and
- an optical amplifier, coupled with the combiner, to amplify the combined optical beam.

27. The system of claim 26, wherein the second optical components comprise:
- an optical circulator coupled with the optical amplifier, to direct the combined optical beam toward the target environment and to direct the target return signal toward the third optical components;
- a collimator coupled with the optical circulator to collimate the combined optical beam and the target return signal; and
- a scanner coupled with the collimator to scan the target environment and to de-scan the target return signal.

28. The system of claim 27, wherein the third optical components further comprise:
- a polarizing beam splitter (PBS) coupled with the optical circulator to separate the target return signal into a CW return signal and an FMCW return signal,
- and wherein the photodetector detects a beat frequency between the FMCW target return signal and the FMCW LO signal to determine the range component of the target return signal based on the velocity component.

29. A method for light detection and ranging (LIDAR), comprising:
- generating a continuous wave (CW) optical beam and a frequency modulated CW (FMCW) optical beam;
- sampling a CW local oscillator (LO) signal from the CW optical beam and an FMCW LO signal from the FMCW optical beam;
- combining the CW optical beam and the FMCW optical beam into a combined optical beam;
- transmitting the combined optical beam toward a target environment;
- distributing CW and FMCW components of a target return signal to optical detectors;
- detecting a first beat frequency corresponding to a target velocity component of the target return signal using a first optical detector; and
- detecting a second beat frequency corresponding to a target range component of the target return signal using a second optical detector.

* * * * *